Aug. 20, 1940.  E. S. CAREY  2,212,200

WATERFRONT PROTECTION SYSTEM

Filed March 8, 1938  2 Sheets-Sheet 1

INVENTOR
E. S. CAREY
BY A. A. Smith
ATTORNEY

Aug. 20, 1940.　　　　E. S. CAREY　　　　2,212,200
WATERFRONT PROTECTION SYSTEM
Filed March 8, 1938　　　2 Sheets-Sheet 2
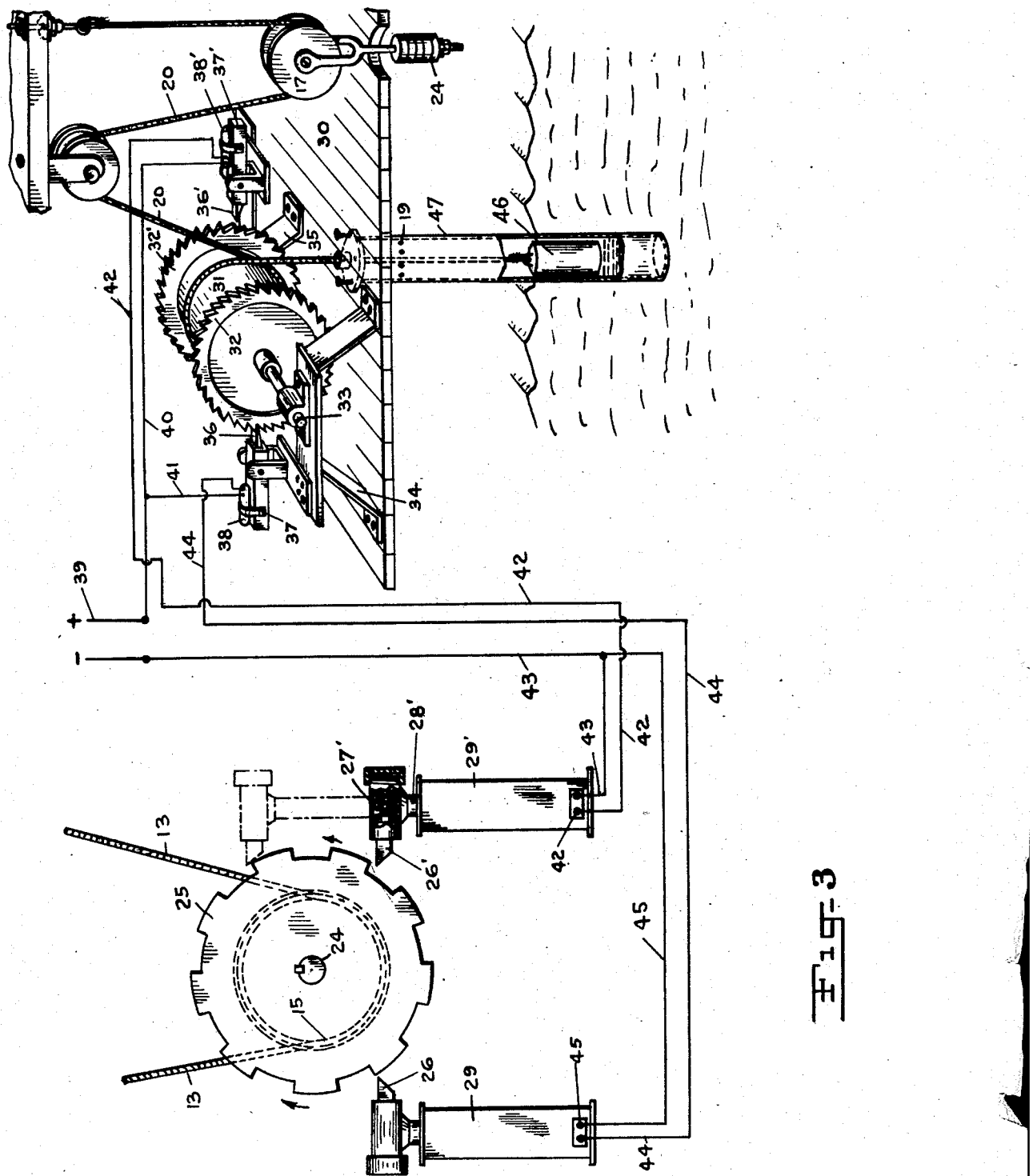
Edward S. Carey INVENTOR.
BY Thayer Heil
ATTORNEY.

Patented Aug. 20, 1940

2,212,200

UNITED STATES PATENT OFFICE 2,212,200

WATERFRONT PROTECTION SYSTEM

Edward S. Carey, Whitestone, N. Y., assignor to American District Telegraph Company, New York, N. Y., a corporation of New Jersey Application March 8, 1938, Serial No. 194,721

5 Claims. (Cl. 177—314)

This invention is directed to a means and method of protecting wharves or waterfront property from intruders and burglary. It has been found difficult to protect a water front where tidal water level rises and falls and therefore it is advantageous to use a radiant energy system of protection for operating an alarm device wherein a source of radiant energy is located at one end and a receiving device is located at the other end of the water front or area to be protected. Thus when the beam is interrupted, an alarm is given. However, in tidal waters it is necessary to consider the difficulty of insuring interruption of the beam at all levels of the tide and therefore, in order to maintain the beam of radiant energy at a predetermined level above the water, where an intruder will necessarily interrupt said beam, in accordance with the invention the radiant energy source and receiver are supported for movement up and down with the tide. The radiant energy system may also be used to detect underwater craft by locating the radiant energy system underneath the surface of the water.

The principal object of this invention is to provide a means for protecting an extended section of water front so that boats or other craft cannot approach a given area without sounding an alarm.

A further object of this invention is to provide a source of radiant energy at one end of the given water front and a receiving means at the other end of the water front, both devices being supported in such a manner that regardless of the variations in a reference plane, for example the tide level of the water, they will always be at a predetermined relation to said plane or the surface of the water. Thus an approaching boat will always intercept the beam of radiant energy and thereby cause an alarm to be given.

Other objects of the invention will appear from the following description of the preferred embodiment thereof shown in the accompanying drawings, wherein:

Fig. 3 is an end view of part of the operating mechanism and also shows in perspective other parts of the system for controlling the portion shown in the end view.

Figure 1:
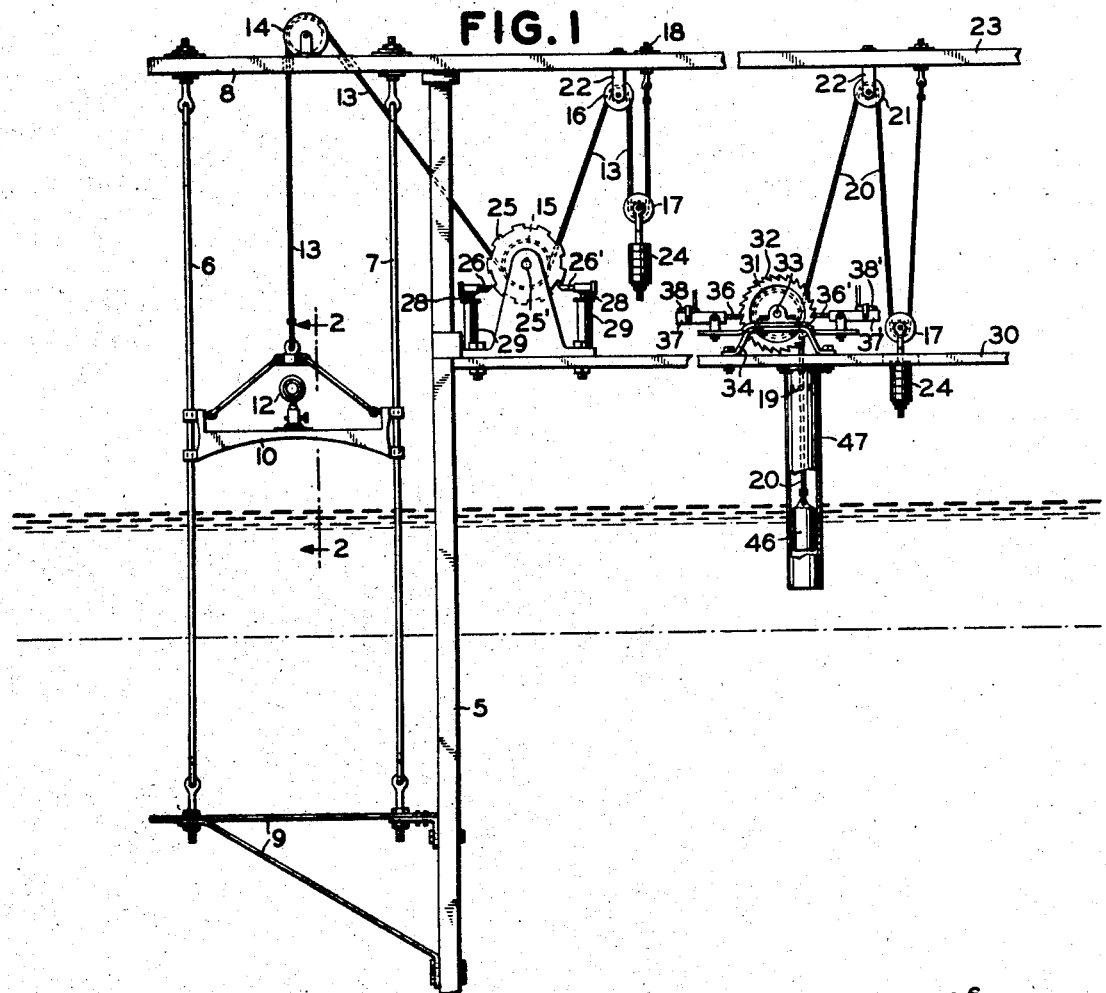
Fig. 1 shows diagrammatically and partly in section a suitable arrangement of float and ray projecting or detecting apparatus embodying an application of my invention.

In Fig. 1 a suitable earth borne standard or framework 5 extends down into the water and may be the end of a pier or other earth borne structure. The guides 6 and 7 extending between brackets 8 and 9 serve to guide a support or platform 10 which in turn carries the ray projector 12 which may be any well known source of radiant energy. The cable 13 is secured at one end to the support 10 and passes over pulley 14, under drum or pulley 15, over pulley 16 and under weight pulley 17 to its anchorage 18.

The apparatus for controlling the level of the support 10 may be mounted at a point remote therefrom and comprises float 46 adapted to travel vertically in a tube 47 having vent holes 19, said tube extending down into the water or if desired, it may be secured in the bed of the river. The float 46 is secured to the end of the cable 20 which passes over drum 31 and over pulley 21 in hanger 22 upon frame 23, said pulley carrying a counterweight 24, the other end of the cable being secured to the frame 23 as shown.

Referring now to Fig. 3, it will be seen that the shaft 25' is provided with toothed wheel 25 as well as drum 15. On opposite sides of wheel 25 are mounted ratchets 26, 26' controlled by springs such as 27'. Plungers 28, 28', in the hydraulic jacks 29, 29' cooperate with the ratchets 26, 26' to raise or lower the ratchets 26, 26' and thus rotate drum 15 in one direction or the other. Any suitable electroresponsive means may be employed to control the drum 15 in response to the closure of the control circuit in a manner to be described.

The elevation of the ray device 12 is controlled by the arrangement shown in the right-hand portion of Fig. 3 where 30 indicates a platform to which the tube 47 is secured for guiding the float 46. This float is suspended by cable 20 which passes over drum 31 having toothed wheels 32, 32' upon shaft 33 in brackets 34, 35. Pawls 36, 36' are slidably mounted in tubes 37, 37' and are spring-pressed to engage the teeth of wheels 32, 32'. The housings 37, 37' support the mercury switches 38, 38' in such a manner that when the wheels rotate in one direction, a circuit is completed by one switch and when rotating in the opposite direction, a circuit is completed by the other switch, the rotation of the drum and wheels being determined by the elevation or depression of the float 17 which in turn rises and falls with the tide.

Electric operating circuits are provided between a source 39, switches 38, 38' and the hydraulic jacks 29, 29'. When switch 38 is operated by toothed wheel 32 a circuit is completed from source 39 to conductor 41, conductor 44, hydraulic jack 29, conductor 45, back to the source 39.

When switch 38' is operated, a circuit is closed from the source 39 through conductors 40, 42, hydraulic jack 29' and conductor 43 back to source 39. Thus as the tide rises the switch 38 is operated and consequently hydraulic jack 29 operates to rotate wheel 25 to lift the support 10 to its proper position. Alternatively, as the tide falls the float 17 operates wheel 32' which in turn operates switch 38' and hydraulic jack 29' to rotate wheel 25 and thus lower the support 10. In this manner it is evident that the support 10 carrying the projector 12 will always be maintained at a given level above the water level.

Figure 2:
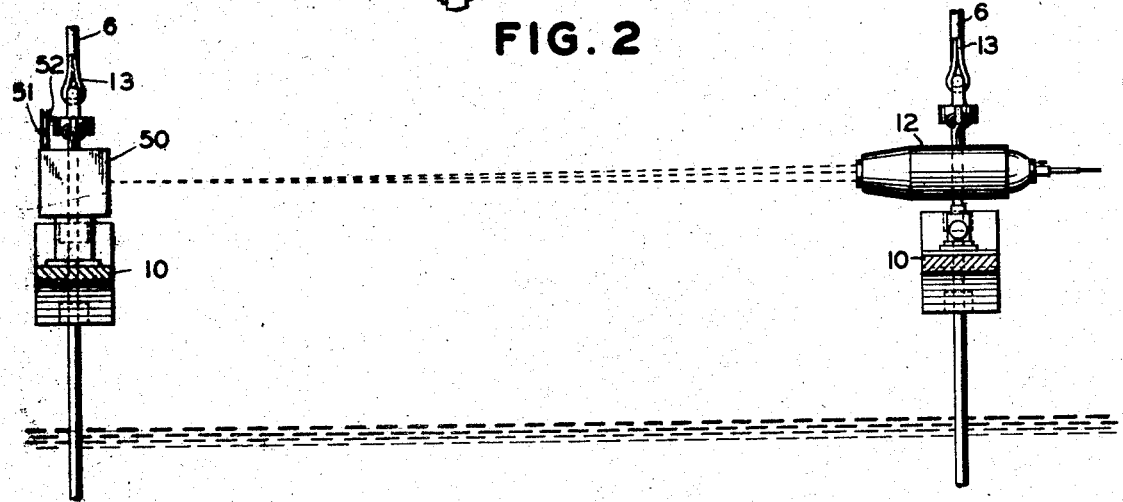
Fig. 2 is a side view on line 2—2 of Fig. 1 of a suitable form of ray projector and ray detector supported in operative relation.

Referring to Fig. 2, the projector 12 is located at one end of the water front area which it is desired to protect and includes a source of radiant energy. Another support similar to 10 may be located at the other end of the water front area and it will carry the receiving means or photocell 50 which may be connected by wires 51 and 52 to any well known form of an alarm. Since the beam of radiant energy is always maintained near the water level, it will be impossible for any intruder in a boat or other craft to pass the beam without causing some sort of an alarm. Alternatively, the variable level control may be arranged to support the source of radiant energy and the receiving means at a given distance underneath the water so that any submerged craft will also cause an alarm. Furthermore, switches 38 and 38' may be arranged to control the level of both supports 10 so that a single control means will maintain the beam of radiant energy at an operative level, or if desired, two or more beams.

Various other modifications may be made in the construction and arrangement of parts without departing from the spirit of the invention set forth in the appended claims.

I claim:

1. A system of the character described having in combination protective ray projecting and receiving mechanism for forming a light barrier over the surface of a body of water, means for supporting said mechanism in operative position and means for automatically controlling the supporting means to maintain a predetermined special relation between the protective mechanism and said surface.

2. A system of the character described having in combination ray projecting and receiving mechanism, earth borne supports for the mechanism and water controlled means for raising and lowering the supports with the rise and fall of tidewater level.

3. A detecting system comprising a source of radiant energy, means for receiving said energy, supporting means for said source and said receiving means whereby the source and receiving means are positioned in fixed alignment and floating control means for determining the level of said supports with respect to a variable water level.

4. A system for the protection of wharves and the like comprising means for detecting the presence of craft on or near the surface of the water in the proximity of the wharf earth borne supporting means for the detecting means and means responsive to changes in the level of the water for controlling the position of said supporting means.

5. A wharf protection system comprising in combination, a beam projecting apparatus, a beam receiving apparatus, earth borne supports, movable supports for said apparatus connected to the earth borne supports, floats influenced by a changing water level and a linkage controlled by said floats for maintaining said movable supports at the desired level with respect to the changing water level.

EDWARD S. CARLEY.